United States Patent
Patel et al.

(10) Patent No.: US 8,326,383 B1
(45) Date of Patent: Dec. 4, 2012

(54) ADHESIVE CASE FOR A MOBILE COMMUNICATION DEVICE

(75) Inventors: Shraddha Patel, Walnut, CA (US); Charlie LaColla, Woodland Hills, CA (US); Vivian Chou, Walnut, CA (US)

(73) Assignee: Superior Communications, Irwindale, CA (US)

( * ) Notice: Subject to any disclaimer, the term of this patent is extended or adjusted under 35 U.S.C. 154(b) by 72 days.

(21) Appl. No.: 13/114,977

(22) Filed: May 24, 2011

(51) Int. Cl.
*H04M 1/00* (2006.01)

(52) U.S. Cl. .................. 455/575.4; 455/566; 455/575.1; 455/575.2; 455/575.3; 455/575.8

(58) Field of Classification Search ............... 455/556.1, 455/556.2, 557.1–575.8, 90.3; 361/679.1–679.16
See application file for complete search history.

(56) References Cited

U.S. PATENT DOCUMENTS

| | | | |
|---|---|---|---|
| 3,907,628 A | 9/1975 | Buske | |
| 5,068,951 A | 12/1991 | Abrams | |
| 5,069,732 A | 12/1991 | Levine | |
| 5,545,287 A | 8/1996 | Carlson | |
| 5,637,177 A | 6/1997 | Os | |
| 6,536,589 B2 | 3/2003 | Chang | |
| 6,754,092 B2 | 6/2004 | McDowell | |
| 6,802,741 B1 | 10/2004 | Shatkin | |
| 6,925,684 B2 | 8/2005 | Kang et al. | |
| 7,226,521 B2 | 6/2007 | Steinhardt et al. | |
| 7,249,976 B1 | 7/2007 | Watson | |
| D556,448 S | 12/2007 | Brandenburg | |
| D559,230 S | 1/2008 | Griffin et al. | |
| D559,529 S | 1/2008 | Griffin et al. | |
| 7,315,097 B2 | 1/2008 | Tajika | |
| 7,349,004 B2 | 3/2008 | Priestman et al. | |
| D575,056 S | 8/2008 | Tan | |
| D582,875 S | 12/2008 | Haspil et al. | |
| 7,505,072 B2 * | 3/2009 | Saitoh | 348/333.01 |
| 7,540,933 B2 | 6/2009 | Dugas et al. | |
| 7,617,079 B2 * | 11/2009 | Stewart et al. | 703/2 |
| 7,663,878 B2 * | 2/2010 | Swan et al. | 361/679.56 |
| 7,784,610 B2 | 8/2010 | Mason | |
| 7,910,833 B2 | 3/2011 | McGinley et al. | |
| 7,923,869 B2 | 4/2011 | Bagenholm et al. | |
| 7,957,524 B2 | 6/2011 | Chipping | |
| 7,960,648 B2 | 6/2011 | McGinley et al. | |
| 2004/0174665 A1 * | 9/2004 | Mockridge et al. | 361/679 |

(Continued)

FOREIGN PATENT DOCUMENTS

DE    102008024339    11/2009

(Continued)

OTHER PUBLICATIONS

EcoSwitch Newsletter, 4 pages, Nov. 2007.

*Primary Examiner* — Dai A Phuong
(74) *Attorney, Agent, or Firm* — Snell & Wilmer, LLP

(57) ABSTRACT

Devices, methods and systems are directed to a top protection portion and a bottom protection portion to protect a front exterior and a back exterior, respectively, of a mobile communication. The top protection portion and the bottom protection portion may each include one or more adhesive members. The adhesive members may be designed to allow a user to remove and apply the top protection portion and the bottom protection portion as desired (e.g., to access a concealed battery of the mobile communication device) without losing their adhesive property.

20 Claims, 5 Drawing Sheets

U.S. PATENT DOCUMENTS

| | | |
|---|---|---|
| 2005/0070328 A1 | 3/2005 | Wang et al. |
| 2005/0287953 A1* | 12/2005 | Ikeda et al. .................. 455/66.1 |
| 2006/0128417 A1* | 6/2006 | Wilson ....................... 455/550.1 |
| 2006/0258325 A1* | 11/2006 | Tsutaichi et al. ............. 455/350 |
| 2007/0029458 A1 | 2/2007 | Wang et al. |
| 2007/0107828 A1 | 5/2007 | Barker et al. |
| 2008/0041529 A1 | 2/2008 | King |
| 2008/0290731 A1 | 11/2008 | Cassidy |
| 2009/0001232 A1 | 1/2009 | Seo et al. |
| 2009/0017883 A1 | 1/2009 | Lin |
| 2009/0027922 A1 | 1/2009 | Tracy et al. |
| 2009/0038927 A1 | 2/2009 | Guo et al. |
| 2009/0186181 A1 | 7/2009 | Mase |
| 2009/0213630 A1 | 8/2009 | Wu |
| 2009/0247237 A1* | 10/2009 | Mittleman et al. ............ 455/567 |
| 2011/0117977 A1* | 5/2011 | Yamashita et al. ......... 455/575.4 |
| 2012/0046002 A1* | 2/2012 | Hill et al. ....................... 455/73 |

FOREIGN PATENT DOCUMENTS

| | | |
|---|---|---|
| EP | 2279864 | 2/2011 |
| GB | 2438655 | 12/2007 |
| GB | 2443454 | 5/2008 |
| JP | 10199422 | 7/1998 |
| KR | 20030032392 | 4/2003 |
| WO | WO 2008/062174 | 5/2008 |

* cited by examiner

ADHESIVE CASE FOR A MOBILE COMMUNICATION DEVICE

BACKGROUND

1. Field

The present invention relates to an apparatus, method and/or system for protecting a front exterior and/or a back exterior of a mobile communication device.

2. Description of Related Art

Electronic devices such as cellular phones, portable tablet computers and the like are gaining widespread popularity. It should not come as a surprise that consumers desire to protect their electronic devices from dents, scratches or other damage. Accordingly, manufacturers have produced different cases, protective films and the like to help the consumer keep their electronic devices safe.

However, not all devices lend themselves to the same type of protection. For example, a "candy bar" type mobile communication device does not transform or slide open to alternative operational orientations. In contrast, "slider" type mobile communication devices, which slide open, pop open, and/or otherwise reveal a keypad in a second orientation, require a case to be functional in both an "open" configuration and a "closed" configuration. Due to their multiple operational configurations, these "slider" type mobile communication devices are more difficult to protect effectively.

Indeed, because a user may repeatedly open and close "slider" type mobile communication devices, these cases typically have two parts, including a top part for protecting the screen and/or the edges of the phone near the screen, and a bottom part for protecting the rear surface of the device. As currently practiced, each of the parts attaches separately to the device, typically with a latching member or by providing a very tight fit, such that the device "snaps" into the case. However, a "latching" case might not be desirable because the latching mechanism required to hold the protective case to the handset can cause damage to the keyboard during use (e.g., scraping across the keyboard resulting in removal of pad printing on the keyboard keys) and hampers the sliding action of the handset through added friction applied by the latches. The latches are also unreliable and may be susceptible to breaking or malfunction due to the thin-walled material required to maintain a hold to the handset. Additionally, protective cases that use latches or other mechanical features to maintain a hold to the handset are less forgiving to build tolerances of the handset (as they require exact build specifications of the handset in order to work appropriately) and may result in an unreliable fit. Certain users may find this rather annoying, while others may feel that such a protective device is "cheap" when compared to other cases that do not contact and/or rub against each other. This particular problem is only magnified as mobile communication devices, including "slider" type devices become sleeker and/or designed to have a thinner profile.

The cases that utilize a tight-fitting silhouette to hold the mobile communication device to the respective top and bottom parts of the case suffer from the drawback that the tight fit may prevent the case from being easily removed when, for example, a user desires to access the battery. Worse, a case of this type may actually cause damage to the device (e.g., scratches, dents) when the user attempts to install and/or remove the case.

What is needed is a protective case for a mobile communication device that solves one or more of the above-described problems.

SUMMARY

Devices, methods and systems are directed to a top protection portion and a bottom protection portion to protect a front exterior and a back exterior, respectively, of a mobile communication device.

In one embodiment, the top protection portion and the bottom protection portion may be highly reliable, have high tolerances for handset build variations and might not obstruct keyboard or keypad usage.

In one embodiment, the present invention may be a system for the protection of a slider phone configured to slide from an open position to a closed position, the system comprising (1) a top protection member removably attached to a top screen side of the slider phone, the top protection member surrounding the entirety of a perimeter of the top screen side, the top protection member including a first receiving portion having a first side wall and a first bottom wall defining a first cavity, and a first attachment member having a first layer of polyurethane elastomer, the first attachment member being disposed within the first cavity of the first receiving portion, a first side of the first attachment member adhesively attached to the first bottom wall of the first receiving portion, and a second side of the first attachment member adhesively and removably attachable to a top screen side of the slider phone via the first layer of polyurethane elastomer and (2) a bottom protection member removably attachable to a rear side of the slider phone, the bottom protection member surrounding the entirety of a perimeter of the rear side and physically separated from the top protection member, the bottom protection member further including a second receiving portion having a second side wall and a second bottom wall defining a second cavity, and a second attachment member having a second layer of polyurethane elastomer, the second attachment member being disposed within the second cavity of the second receiving portion, a first side of the second attachment member adhesively attached to the second bottom wall of the second receiving portion, and a second side of the second attachment member adhesively and removably attachable to the rear side of the slider via the layer of polyurethane elastomer.

In one embodiment, the present invention may be a removably attachable protective apparatus for a mobile communication device comprising (1) a shell for protecting a portion of a surface of the mobile communication device, the shell spanning a perimeter of the surface of the mobile communication device, the shell including a first interior side wall, and a first interior bottom wall, the perimeter of the first interior bottom wall bounded by the first interior side wall and defining a first interior cavity, the first interior side wall and the first interior bottom wall located wholly within the shell and (2) a first attachment member being disposed in the first interior cavity, the attachment member having a thickness greater than a depth of the first interior cavity such that a portion of the first attachment member protrudes out of the first interior cavity, the first attachment member having a first layer for contacting and adhering to the first interior bottom wall and a second layer positioned at the portion of the first attachment member that protrudes out of the first interior cavity, the second layer configured to contact and removably adhere to the surface of the mobile communication device.

In one embodiment, the present invention may be a removably attachable protective apparatus for a mobile communication device comprising (1) a top shell for protecting a portion of a top surface of the mobile communication device, the top shell having two parallel longitudinal bars and two parallel latitudinal bars, the longitudinal and latitudinal bars forming an outer perimeter of a quadrilateral, the top shell including a first set of walls forming a first cavity in the first longitudinal bar, a second set of walls forming a second cavity in the second longitudinal bar, a third set of walls forming a third cavity in the first latitudinal bar, and a fourth set of walls forming a fourth cavity in the second latitudinal bar, (2) a first adhesive attachment member disposed within the first cavity for removably adhering the first longitudinal bar to a portion of the mobile communication device, (3) a second adhesive attachment member disposed within the second cavity for removably adhering the second longitudinal bar to a portion of the mobile communication device, (4) a third adhesive attachment member disposed within the third cavity for removably adhering the first latitudinal bar to a portion of the mobile communication device, and (5) a fourth adhesive attachment member disposed within the fourth cavity for removably adhering the second latitudinal bar to a portion of the mobile communication device. The apparatus may further comprise (6) a bottom shell for protecting a portion of a bottom surface of the mobile communication device, the bottom shell including a fifth set of walls forming a fifth cavity, and (7) a fifth adhesive attachment member disposed within the fifth cavity for removably adhering the bottom shell to the portion of the bottom surface the mobile communication device.

In one embodiment, the top protection member and the bottom protection member might not include latching portions, thereby avoiding contact with each other during the user's utilization of the mobile communication. The avoidance of using latching portions may further allow for a slimmer or thinner profile of the top protection member and the bottom protection member. In this embodiment, the top protection member and the bottom protection member may further be independent of each other and may adhere to the mobile communication device via one or more polyurethane or gel members.

In one embodiment, the top protection member and the bottom protection member might not provide complementary inward pressures to hold the top protection member and the bottom protection member to the respective portions of the mobile communication device. In this embodiment, the top protection member and the bottom protection member may further be independent of each other and may adhere to the mobile communication device via one or more polyurethane or gel members, thereby allowing a gap between the protection member and the corresponding edges of the mobile communication device.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and/or methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1A:
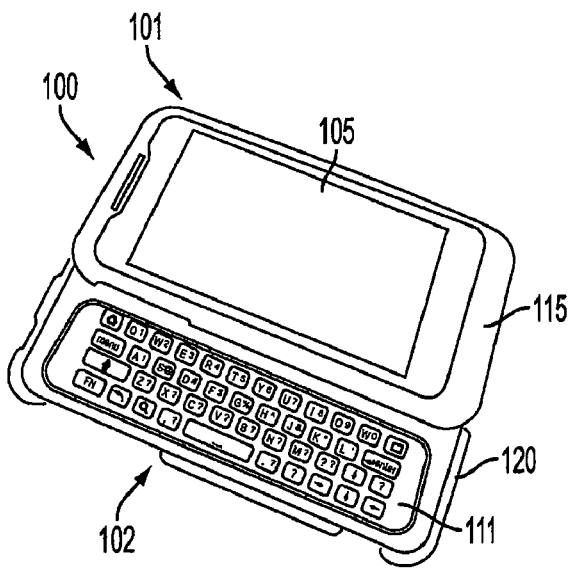
FIG. 1A illustrates a front perspective view of a top protection portion and a bottom protection portion in an assembled state on an "open" mobile communication device according to one or more embodiments described herein.
Figure 1B:
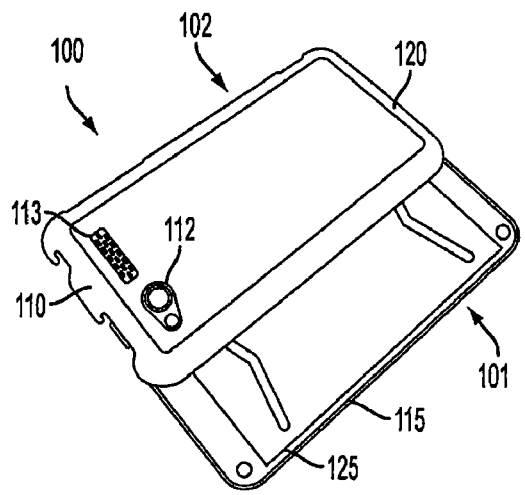
FIG. 1B illustrates a rear perspective view of a top protection portion and a bottom protection portion in an assembled state on an "open" mobile communication device according to one or more embodiments described herein.

FIGS. 1A and 1B illustrate a front perspective view and a rear perspective view, respectively, of a mobile communication device 100 which may be a "slider" type cellular phone. The mobile communication device 100 may include two portions, a screen portion 101 and a back portion 102 that slide past each other (e.g., on rails) in an open configuration, and slide back together in a closed configuration. As shown in FIGS. 1A and 1B, the mobile communication device 100 is in the open configuration. Here, the mobile communication device 100 may have four exposed surfaces that are substantially parallel to one another, including a top screen surface 105 and a back screen surface 125 (shown in FIG. 1B) of the screen portion 101, and a typing surface 111 and a rear surface 110 (shown in FIG. 1B) of the back portion 102. As shown, the edges of the top screen surface 105 may be protected by a top protection member 115. The top protection member 115 may span the entire perimeter of the top screen surface 105 and may protect the perimeter of the top screen surface 105 from scratches, dents, chips, etc. by acting as a shield. The top protection member 115 does not contact any part of the rear surface 110 or the typing surface 111. The rear surface 110 may be covered and protected by a bottom protection member 120. Conversely, the bottom protection member 120 does not contact any part of the top screen surface 105 or the back screen surface 125. The entirety of the typing surface 111 is also unimpeded by the protection members 115 and 120. Furthermore, the edges of the typing surface 111 may also be unimpeded thereby allowing the user to be unencumbered by the protection members 115 and 120.

FIG. 1B illustrates a rear perspective view of the mobile communication device 100 with the top protection member 115 and the bottom protection member 120 assembled to protect the top screen surface 105 and the rear surface 110, respectively. As shown, the bottom protection member 120 substantially covers the entirety of the rear surface 110 while leaving openings 112 and 113 for user access to a camera and a speaker and without contacting the back screen surface 125 and or the top protection member 115. In this manner, the bottom protection member 120 does not contact and/or rub against the back screen surface 125 and or the top protection member 115 each time the user opens and/or closes the mobile communication device 100.

Figure 1C:
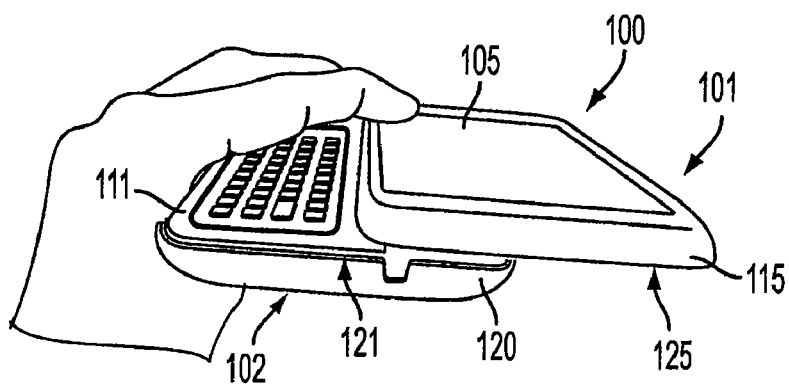
FIG. 1C illustrates a side perspective view of a top protection portion and a bottom protection portion in an assembled state on an "open" mobile communication device according to one or more embodiments described herein.

FIG. 1C illustrates a side perspective view of the mobile communication device 100. As shown, the bottom protection member 120 does not contact, for example, the top protection member 115. Accordingly, a plane defined by a top edge 121 may be different than a plane defined by the typing surface 111. More particularly, the plane defined by the top edge 121 may be further away from the top portion 101 than the plane defined by the typing surface 111.

Figure 1D:
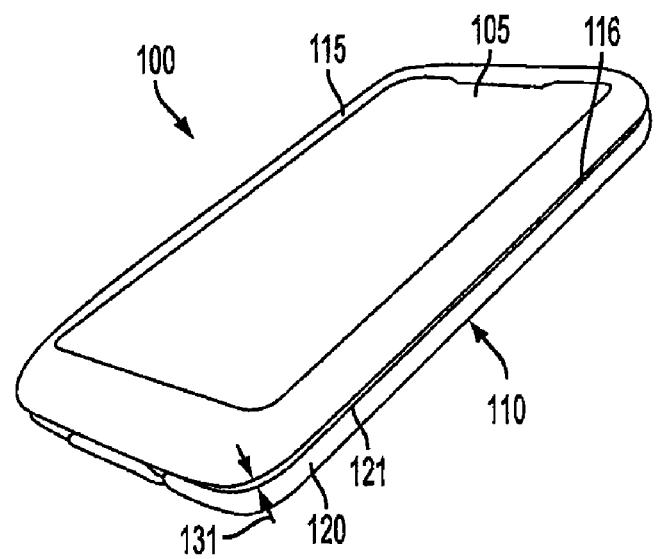
FIG. 1D illustrates a front perspective view of a top protection portion and a bottom protection portion in an assembled state on a "closed" mobile communication device in an open configuration according to one or more embodiments described herein.

FIG. 1D illustrates a perspective view of the mobile communication device 100 in a closed configuration. When the mobile communication device 100 is in a closed configuration, only two surfaces may be exposed (e.g., the top screen surface 105 and the rear surface 110), while the back screen surface 125 and the typing surface 111 may be hidden as shown in FIG. 1D. Because the back screen surface 125 and the typing surface 111 are concealed in the closed configuration, protection for these surfaces 111 and 125 might not be required or as pertinent as protection for the top screen surface 105 and the rear surface 110 which are always exposed regardless of the configuration of the mobile communication device 100. As shown, a gap 131 illustrates the separation between the top protection member 115 and the bottom protection member 120.

Figure 1E:
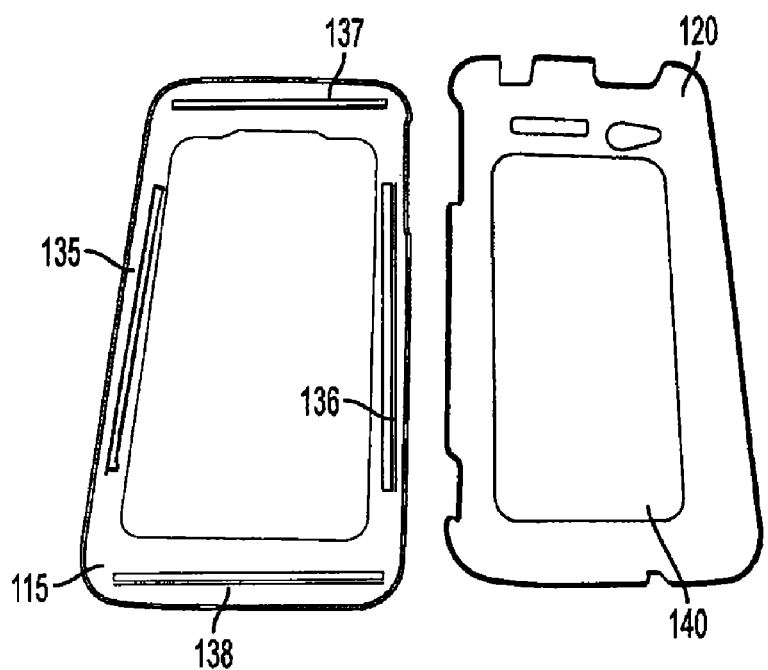
FIG. 1E illustrates a front perspective view of a top protection portion and a bottom protection portion in an unassembled state according to one or more embodiments described herein.

FIG. 1E illustrates the top protection member 115 and the bottom protection member 120 in an unassembled state apart from the mobile communication device 100. The top protection member 115 may include four attachment members 135, 136, 137 and 138 for removably attaching the top protection member 115 to the mobile communication device 100. The four attachment members 135, 136, 137 and 138 may include a first set of parallel attachment members 135 and 136 and a second set of parallel attachment members 137 and 138. While shown to be a long strip in FIG. 1E, the attachment members 135, 136, 137 and 138 may be shaped differently and may be placed at different locations. For example, the attachment members 135, 136, 137 and 138 may be circles having a diameter of 0.5 cm and may be placed at the four corners of the top protection member 115. While the above examples include four attachment members, any number of attachment members may be utilized. For example, a unitary attachment member substantially following the perimeter of the top screen surface 105 and substantially having the same shape ("open box") may be utilized.

The bottom member 120 may include an attachment member 140 for removably attaching the bottom protection member 120 to the mobile communication device 100. As shown, the attachment member 140 is a rectangular patch having a shape substantially similar to the shape of the bottom protection member 120. However, any shape is possible (e.g., a large circle, triangle, or non-geometric shape). In one embodiment, the material used to construct the attachment member 140 may be the same material used to construct attachment members 135, 136, 137 and 138, which is detailed below with respect to FIG. 2.

Figure 1H:
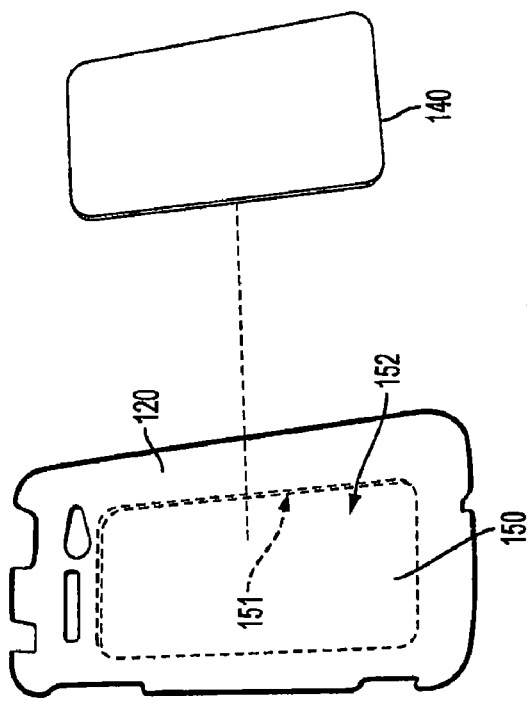
FIG. 1H illustrates a front perspective, exploded view of a bottom protection portion in an unassembled state according to one or more embodiments described herein.
Figure 1G:
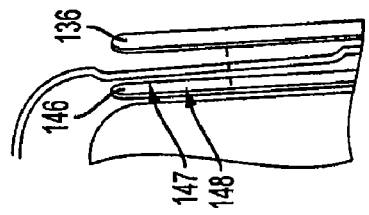
FIG. 1G is a close up view of one receiving portion/attachment member pair according to one or more embodiments described herein.
Figure 1F:
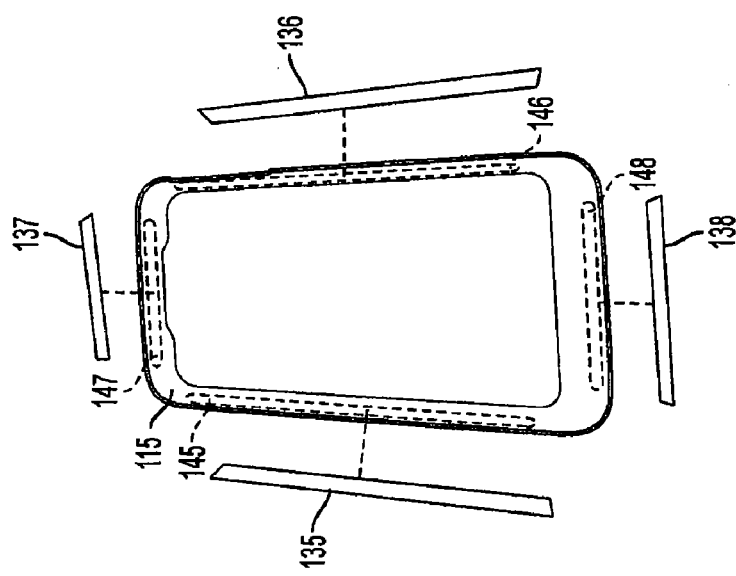
FIG. 1F illustrates a front perspective, exploded view of a top protection portion in an unassembled state according to one or more embodiments described herein.

Turning to FIG. 1F, an exploded view of the top protection member 115 is shown with receiving portions 145, 146, 147 and 148 for receiving attachment members 135, 136, 137 and 138, respectively. The receiving portions 145, 146, 147 and 148 may each be a cavity formed by thinning out or creating indented areas within the top protection member 115 at those portions. In this embodiment, the thickness of the attachment members 135, 136, 137 and 138, respectively, may be configured to be slightly larger than the depth of the cavity such that only a portion of each of the attachment members 135, 136, 137 and 138 protrudes out of the receiving portions 145, 146, 147 and 148 and contacts the mobile communication device 100.

FIG. 1G is a close up view of one corresponding pair of the receiving portion 146 and the attachment member 136. As shown, the receiving portion 146 may include a side wall 147 and a bottom wall 148 defining a cavity of the receiving portion 146. The circumference of the side wall 147 may be configured to be less than a circumference of the top protection member 115. When the attachment member 136 is inserted into the receiving portion 146, each of three sides of the attachment member 136 may press against the side wall 147 and/or the bottom wall 148, leaving one side open to contact the mobile communication device 100. In this manner, the mobile communication device 100 may be attached to the top protection member 115.

FIG. 1H is an exploded view of the bottom protection member 120 with a receiving portion 150 for receiving attachment member 140. As shown, the receiving portion 150 may include a side wall 151 and a bottom wall 152 defining a cavity of the receiving portion 150. The circumference of the side wall 151 may be configured to be less than a circumference of the bottom protection member 120. The cavity of the receiving portion 150 may be formed by thinning out or creating an indented area within the bottom protection member 120. In this embodiment, the thickness of the attachment member 140 may be configured to be slightly larger than the depth of the cavity such that only a portion of the attachment member 140 protrudes out of the receiving portion 150 and contacts the mobile communication device 100. When the attachment member 140 is inserted into the receiving portion 150, each of three sides of the attachment member 140 may press against the side wall 151 and/or the bottom wall 152, leaving one side open to contact the mobile communication device 100. In this manner, the mobile communication device 100 may be attached to the bottom protection member 120.

In one embodiment, the top protection member 115 and the bottom protection member 120 might not include latches to hold the top protection member 115 and the bottom protection member 120 to the respective portions of the mobile communication device 100. In this embodiment, the top protection member 115 and the bottom protection member 120 may further be independent of each other and may be held to the mobile communication device 100 only via one or more polyurethane or gel members.

In one embodiment, the top protection member 115 and the bottom protection member 120 might not provide complementary inward pressures to hold the top protection member 115 and the bottom protection member 120 to the respective portions of the mobile communication device 100. In this embodiment, the top protection member 115 and the bottom protection member 120 may further be independent of each other and may be held to the mobile communication device 100 only via one or more polyurethane or gel members.

Figure 2:
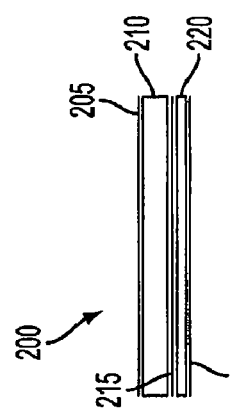
FIG. 2 illustrates a cross sectional view of an adhesive member according to one or more embodiments described herein.

FIG. 2 is a cross-sectional view of an attachment member 200. The attachment member 200 may be an attachment member 135, 136, 137, 138 and/or 140 of FIG. 1E, and may be shaped as desired (e.g., as a thin strip of attachment member 136 or as a large quadrilateral of attachment member 140) and may, in one embodiment, have an overall thickness of between 0.1 mm and 3 mm. The attachment member 200 may include a plurality of layers. For example, the attachment member 200 may have a first removable layer 205, which may be removed immediately prior to attachment to a mobile communication device (e.g., the mobile communication device 100). The first removable layer 205 may be a thin polyester or polyethylene terephthalate (PET) film and may initially contact and fully cover a surface of a mobile communication device attachment (MCDA) layer 210 to keep the surface of the MCDA layer 210 clean and debris-free before the surface of the MCDA layer 210 is brought into contact and attached to the mobile communication device (e.g., the mobile communication device 100). The MCDA layer 210 may be constructed out of a polyurethane (PU) elastomer, such as a plastic, silicone or rubber, and may exhibit strong adhesive qualities when in contact with a surface of another object (e.g., the mobile communication device 100) while allowing for easy removal when a force is applied to separate the MCDA layer 210 and the surface of the other object, and without damaging the surface of the other object. Moreover, when the PU elastomer is reapplied to the surface of another object, it may retain most, if not all, of its original adhesive qualities. In other words, the material of the PU elastomer is designed to repeatedly provide strong adhesiveness but remain susceptible to a separation force exerted by a user. One benefit to using a PU elastomer with these characteristics is that a user may remove and attach a protection member (e.g., the bottom protection member 120) from a mobile communication device (e.g., the mobile communication device 100) as desired, thereby allowing, for example, frequent access to the concealed battery of the mobile communication device 100 as needed. The MCDA layer 210 may be permanently or semi-permanently attached on another side to a thin layer of PET film 215. The PET film 215 acts to separate the MCDA layer 210 from an acrylic layer 220. The acrylic layer 220 may function to permanently or semi-permanently attach the attachment member 200 to a top or bottom protection member 225 (e.g., the top protection member 115 or the bottom protection member 120). In this manner, when the user attempts to separate the top or bottom protection member (e.g., the top protection member 115 or the bottom protection member 120) from the mobile communication device 100, the attachment layer 200 may stay attached to the top or bottom protection member 225 while the MCDA layer 210 is separated from the mobile communication device 100. In one embodiment, the acrylic layer 220 may be coated with an adhesive (e.g., an acrylic adhesive or any other glue-like substance) to further strengthen the hold between the acrylic layer 220 and the top or bottom protection member 225.

The usage of one or more attachment members 200 may advantageously provide the protection members (e.g., protection members 115 and 120) with high reliability and high tolerance for build variations. In other words, the utilization of the attachment members 200 may allow for significant flexibility in the physical design of the protection members since the attachment members 200 negate a need for including mechanical attachment devices (e.g., latches) and/or tight-fitting dimensions for the protection members to mate and hold themselves to the mobile communication device (e.g., mobile communication device 100) via, for example, compression.

Figure 3A:
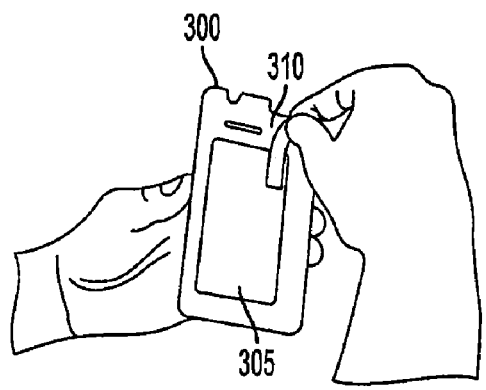
FIG. 3A illustrates a step of preparing a bottom protection portion for assembly to a mobile communication device according to one or more embodiments described herein.
Figure 3B:
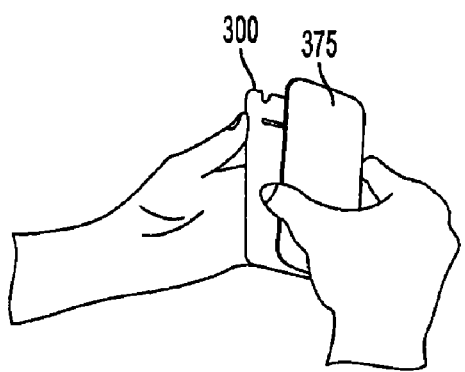
FIG. 3B illustrates a step of assembling the bottom protection portion with the mobile communication device according to one or more embodiments described herein.
Figure 3C:
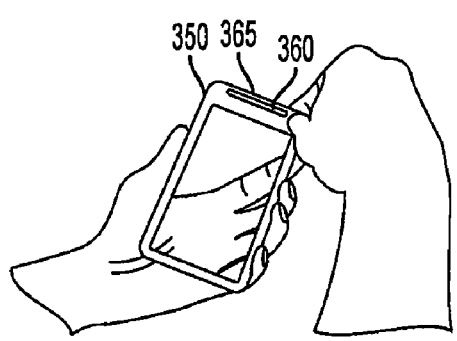
FIG. 3C illustrates a step of preparing a top protection portion for assembly to a mobile communication device according to one or more embodiments described herein.
Figure 3D:
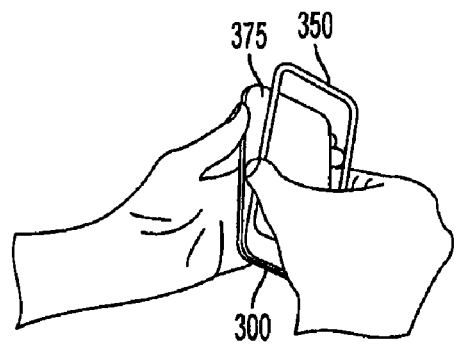
FIG. 3D illustrates a step of assembling the top protection portion with the mobile communication device according to one or more embodiments described herein.
Figure 3E:
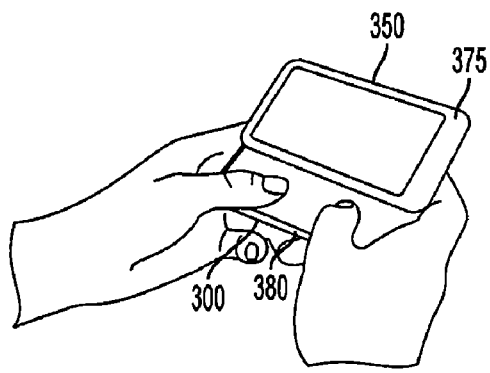
FIG. 3E illustrates a perspective view of the assembled protection portions with the mobile communication device according to one or more embodiments described herein.

FIGS. 3A-3E illustrate a method of attaching a top protection member 350 and a bottom protection member 300 to a mobile communication device 375. As shown in FIG. 3A, a user may remove a tab 310 on the bottom protection member 300. The removal of the tab 310 may also cause the removal of a PET film layer 305, thereby exposing an attachment member (not shown). As shown in FIG. 3B, the user may then insert the mobile communication device 375 in a closed configuration into the bottom protection member 300 with the rear (non-screen side) contacting the area that was originally covered by the PET film 305. Accordingly, the mobile communication device 375 is immediately held in place by the attachment member (not shown). This may conclude the attachment process of the bottom protection member 300 to the mobile communication device 375. In a similar manner, as shown in FIG. 3C, the user may remove a tab 360 (and any other tabs) on the top protection member 350, which may cause the removal of a PET film layer 365. As shown in FIG. 3D, the user may attach the top protection member 350 to a screen surface of the mobile communication device 375 by simply pressing the top protection member 350 to the surface of the mobile communication device 375. In one embodiment, the top protection member 350 might not protect the entirety of the screen, but instead may be a frame that protects the edges of the side of the mobile communication device 375 having the screen. Alternatively, the top protection member 350 may include a clear or transparent screen protection device (e.g., a film or other covering). FIG. 3E illustrates the mobile communication device 375 in an open configuration with the top protection member 350 and the bottom protection member 300 as attached thereto.

Figure 4A:
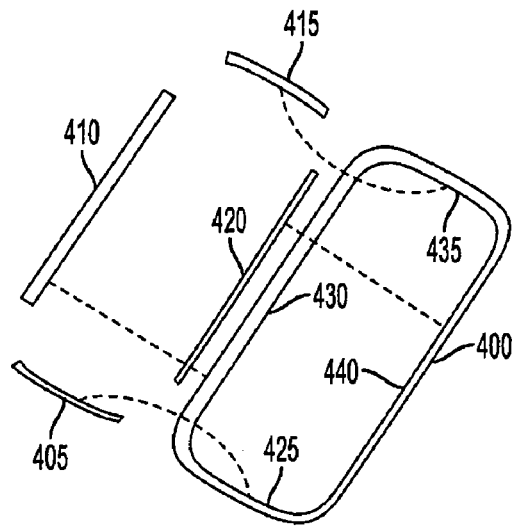
FIG. 4A illustrates a front perspective, exploded view of a top protection portion in an unassembled state according to one or more embodiments described herein.
Figure 4B:
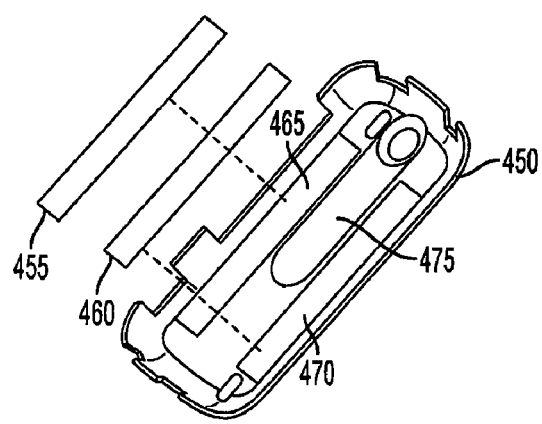
FIG. 4B illustrates a front perspective, exploded view of a bottom protection portion in an unassembled state according to one or more embodiments described herein.

FIGS. 4A and 4B illustrate another embodiment of a top protection member 400 and a bottom protection member 450 applying many of the same principles described above with respect to the top protection member 115 and the bottom protection member 120 of FIG. 1H. Accordingly, focus will be placed on the differences. However, one of ordinary skill in the art will recognize that the differences are merely an example of one of many possible variations. As shown in FIG. 4A, the top protection member 400 may be configured to attach to a top screen surface (e.g., the top screen surface 105) of a mobile communication device (e.g., the mobile communication device 100). The top protection member 400 may include four receiving portions 425, 430, 435 and 440 for receiving attachment members 405, 410, 415 and 420, respectively. The attachment members 405, 410, 415 and 420 may then be removably attachable to the aforementioned top screen surface (e.g., the top screen surface 105) of the mobile communication device (e.g., the mobile communication device 100).

FIG. 4B illustrates the bottom protection member 450 configured to attach to a rear surface (e.g., the rear surface 110) of a mobile communication device (e.g., the mobile communication device 100). The bottom protection member 450 may include two receiving portions 465 and 470 for receiving attachment members 455 and 460, respectively. The attachment members 455 and 460 may then be removably attachable to the aforementioned rear surface (e.g., the rear surface 110) of the mobile communication device (e.g., the mobile communication device 100). The attachment members 455 and 460 may also straddle an opening 475, thereby leaving the opening 475 unimpeded. In this manner, the attachment members 455 may be placed at various locations to allow the opening 475 to remain unblocked.

Skilled artisans may implement the described functionality in varying ways for each particular application, but such implementation decisions should not be interpreted as causing a departure from the scope of the disclosed apparatus and/or methods.

The previous description of examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The elements and uses of the above-described embodiments can be rearranged and combined in manners other than specifically described above, with any and all permutations within the scope of invention. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. In addition, the invention is not limited to the illustrated embodiments, and all embodiments of the invention need not necessarily achieve all the advantages or purposes or possess all characteristics identified herein.

What is claimed is:

1. A system for the protection of a slider phone configured to slide from an open position to a closed position, the system comprising:
    a top protection member removably attached to a top screen side of the slider phone, the top protection member surrounding the entirety of a perimeter of the top screen side, the top protection member including:
        a first receiving portion having a first side wall and a first bottom wall defining a first cavity, and
        a first attachment member having a first layer of polyurethane elastomer, the first attachment member being disposed within the first cavity of the first receiving portion, a first side of the first attachment member adhesively attached to the first bottom wall of the first receiving portion, and a second side of the first attachment member adhesively and removably attachable to a top screen side of the slider phone via the first layer of polyurethane elastomer; and
    a bottom protection member removably attachable to a rear side of the slider phone, the bottom protection member surrounding the entirety of a perimeter of the rear side and physically separated from the top protection member, the bottom protection member further including:
        a second receiving portion having a second side wall and a second bottom wall defining a second cavity, and
        a second attachment member having a second layer of polyurethane elastomer, the second attachment member being disposed within the second cavity of the second receiving portion, a first side of the second attachment member adhesively attached to the second bottom wall of the second receiving portion, and a second side of the second attachment member adhesively and removably attachable to the rear side of the slider phone via the layer of polyurethane elastomer.

2. The system of claim 1, wherein the first attachment member is attached to the first bottom wall of the first receiving portion via a layer of acrylic rubber.

3. The system of claim 2, wherein the layer of polyurethane elastomer is attached to the layer of acrylic rubber via a PET film.

4. The system of claim 1, wherein the top protection member further comprising:
    a third receiving portion having a third side wall and a third bottom wall defining a third cavity, and
    a third attachment member having a third layer of polyurethane elastomer, the third attachment member being disposed within the third cavity of the third receiving portion, a first side of the third attachment member adhesively attached to the third bottom wall of the third receiving portion, and a second side of the third attachment member adhesively and removably attachable to a top screen side of the slider phone via the third layer of polyurethane elastomer.

5. The system of claim 4, wherein the top protection member further comprising:
    a fourth receiving portion having a fourth side wall and a fourth bottom wall defining a fourth cavity, and
    a fourth attachment member having a fourth layer of polyurethane elastomer, the fourth attachment member being disposed within the fourth cavity of the fourth receiving portion, a first side of the fourth attachment member adhesively attached to the fourth bottom wall of the fourth receiving portion, and a second side of the fourth attachment member adhesively and removably attachable to a top screen side of the slider phone via the fourth layer of polyurethane elastomer.

6. The system of claim 5, wherein the top protection member further comprising:
    a fifth receiving portion having a fifth side wall and a fifth bottom wall defining a fifth cavity, and
    a fifth attachment member having a fifth layer of polyurethane elastomer, the fifth attachment member being disposed within the fifth cavity of the fifth receiving portion, a first side of the fifth attachment member adhesively attached to the fifth bottom wall of the fifth receiving portion, and a second side of the fifth attachment member adhesively and removably attachable to a top screen side of the slider phone via the fifth layer of polyurethane elastomer.

7. The system of claim 1, wherein the first attachment member is the sole component for attaching the top protection member to the slider phone.

8. The system of claim 1, wherein the first attachment member is the sole component for attaching the bottom protection member to the slider phone.

9. The system of claim 1, wherein the top protection member is latchless.

10. The system of claim 1, wherein the bottom protection member is latchless.

11. A removably attachable protective apparatus for a mobile communication device comprising:
    a shell for protecting a portion of a surface of the mobile communication device, the shell spanning a perimeter of the surface of the mobile communication device, the shell including:
        a first interior side wall, and
        a first interior bottom wall, the perimeter of the first interior bottom wall bounded by the first interior side wall and defining a first interior cavity, the first interior side wall and the first interior bottom wall located wholly within the shell; and a first attachment member being disposed in the first interior cavity, the attachment member having a thickness greater than a depth of the first interior cavity such that a portion of the first attachment member protrudes out of the first interior cavity, the first attachment member having a first layer for contacting and adhering to the first interior bottom wall and a second layer positioned at the portion of the first attachment member that protrudes out of the first interior cavity, the second layer configured to contact and removably adhere to the surface of the mobile communication device.

12. The apparatus of claim 11, wherein the first attachment member comprises at least three layers of different materials.

13. The apparatus of claim 12, wherein the three layers of three different material comprise:
    a polyurethane elastomer layer for contacting and removably adhering to the top screen side of the mobile communication device;
    an acrylic rubber layer for contacting and adhering to the bottom wall of the cavity; and
    a PET layer positioned between the polyurethane layer and the acrylic rubber layer, the PET layer for attaching the polyurethane layer to the acrylic rubber layer.

14. The apparatus of claim 13, wherein the polyurethane elastomer layer comprises the second layer.

15. The apparatus of claim 14, wherein the acrylic rubber layer comprises the first layer.

16. The apparatus of claim 11, wherein the shell further comprises:
    a second interior side wall, and
    a second interior bottom wall, the perimeter of the second interior bottom wall bounded by the second interior side wall and defining a second interior cavity, the second interior side wall and the second interior bottom wall located wholly within the shell.

17. The apparatus of claim 16, wherein the apparatus further comprises a second attachment member being disposed in the second interior cavity, the second attachment member having a thickness greater than a depth of the second interior cavity such that a portion of the second attachment member protrudes out of the second interior cavity, the second attachment member including:
    a polyurethane elastomer layer for contacting and removably adhering to the top screen side of the mobile communication device;
    an acrylic rubber layer for contacting and adhering to the bottom wall of the cavity; and
    a PET layer positioned between the polyurethane layer and the acrylic rubber layer, the PET layer for attaching the polyurethane layer to the acrylic rubber layer.

18. A removably attachable protective apparatus for a mobile communication device comprising:
    a top shell for protecting a portion of a top surface of the mobile communication device, the top shell having two parallel longitudinal bars and two parallel latitudinal bars, the longitudinal and latitudinal bars forming an outer perimeter of a quadrilateral, the top shell including:
        a first set of walls forming a first cavity in the first longitudinal bar,
        a second set of walls forming a second cavity in the second longitudinal bar,
        a third set of walls forming a third cavity in the first latitudinal bar, and
        a fourth set of walls forming a fourth cavity in the second latitudinal bar,
    a first adhesive attachment member disposed within the first cavity for removably adhering the first longitudinal bar to a portion of the mobile communication device;
    a second adhesive attachment member disposed within the second cavity for removably adhering the second longitudinal bar to a portion of the mobile communication device;
    a third adhesive attachment member disposed within the third cavity for removably adhering the first latitudinal bar to a portion of the mobile communication device; and
    a fourth adhesive attachment member disposed within the fourth cavity for removably adhering the second latitudinal bar to a portion of the mobile communication device.

19. The apparatus of claim 18 further comprising:
    a bottom shell for protecting a portion of a bottom surface of the mobile communication device, the bottom shell including a fifth set of walls forming a fifth cavity; and
    a fifth adhesive attachment member disposed within the fifth cavity for removably adhering the bottom shell to the portion of the bottom surface the mobile communication device.

20. The apparatus of claim 19, wherein the first adhesive attachment member, the second adhesive attachment member, the third adhesive attachment member, the fourth adhesive attachment member, and the fifth adhesive attachment member each comprise a polyurethane elastomer layer.

* * * * *